US011928147B2

(12) United States Patent
Ou (10) Patent No.: US 11,928,147 B2
(45) Date of Patent: Mar. 12, 2024

(54) SLIDE STORAGE METHOD AND APPARATUS (71) Applicants: BEIJING KINGSOFT OFFICE SOFTWARE, INC., Beijing (CN); ZHUHAI KINGSOFT OFFICE SOFTWARE CO., LTD, Guangdong (CN)

(72) Inventor: Yuejian Ou, Guangdong (CN)

(73) Assignees: BEIJING KINGSOFT OFFICE SOFTWARE, INC.; ZHUHAI KINGSOFT OFFICE SOFTWARE CO., LTD

(*) Notice: Subject to any disclaimer, the term of this patent is extended or adjusted under 35 U.S.C. 154(b) by 0 days.

(21) Appl. No.: 17/619,432

(22) PCT Filed: Aug. 5, 2020

(86) PCT No.: PCT/CN2020/107050
§ 371 (c)(1),
(2) Date: Dec. 15, 2021

(87) PCT Pub. No.: WO2021/023210
PCT Pub. Date: Feb. 11, 2021

(65) Prior Publication Data
US 2022/0245186 A1 Aug. 4, 2022

(30) Foreign Application Priority Data
Aug. 5, 2019 (CN) .......................... 201910718635.8

(51) Int. Cl.
G06F 16/00 (2019.01)
G06F 16/438 (2019.01)
G06F 16/48 (2019.01)

(52) U.S. Cl.
CPC .......... *G06F 16/48* (2019.01); *G06F 16/4393* (2019.01)

(58) Field of Classification Search
CPC ...... G06F 16/48; G06F 16/4393; G06F 16/17; G06F 16/41
See application file for complete search history.

(56) References Cited

U.S. PATENT DOCUMENTS

| 6,369,835 B1* | 4/2002 | Lin .......................... G06Q 10/10 715/730 |
| 2005/0108619 A1 | 5/2005 | Theall et al. |

(Continued)

FOREIGN PATENT DOCUMENTS

| CN | 1862535 A | 11/2006 |
| CN | 104850559 A | 8/2015 |

(Continued)

OTHER PUBLICATIONS

ISA State Intellectual Property Office of the People's Republic of China, International Search Report Issued in Application No. PCT/CN2020/107050, dated Nov. 9, 2020, WIPO, 4 pages.

(Continued)

*Primary Examiner* — Paul Kim
(74) *Attorney, Agent, or Firm* — Zhong Law, LLC (57) ABSTRACT The embodiments of the present disclosure provide a method and apparatus of storing slides related to the field of computer technology. The method comprises: the electronic device receives a save-as instruction for target custom show information generated in a first presentation file, wherein the target custom show information includes slides selected from the first presentation file and a show sequence of the selected slides; acquires, based on the save-as instruction, property information of a second presentation file; extracts, based on the property information and following the show sequence of the slides of the target custom show informa- (Continued)

tion, the slide data corresponding to the slides selected from the first presentation file, and stores them in the second presentation file.

11 Claims, 3 Drawing Sheets

(56) References Cited

U.S. PATENT DOCUMENTS

2005/0273693 A1    12/2005   Peterson
2006/0294046 A1*   12/2006   Sareen ................ G06F 40/169
2009/0259988 A1    10/2009   Hertenstein

FOREIGN PATENT DOCUMENTS

| CN | 109977363 A | 7/2019 |
|---|---|---|
| JP | H05120398 A | 5/1993 |
| JP | 2001103415 A | 4/2001 |
| KR | 20050081336 A | 8/2005 |

OTHER PUBLICATIONS

ISA State Intellectual Property Office of the People's Republic of China, Written Opinion of the International Searching Authority Issued in Application No. PCT/CN2020/107050, dated Nov. 9, 2020, WIPO, 5 pages.(Submitted with Machine/Partial Translation).
European Patent Office, Extended European Search Report issued in Application No. 20850614.7 dated Jun. 20, 1 2022, 7 pages.
JPO, Notice of Reasons for Refusal issued in Application No. 2021-574266 dated Mar. 16, 2023, 8 pages.
IPOS, Written Opinion issued in Application No. 11202113947T dated Jun. 12, 2023, 9 pages.
Chinese Patent Office, First Office Action issued in Application No. 2019107186358 dated Mar. 25, 2023, 10 pages.

* cited by examiner

SLIDE STORAGE METHOD AND APPARATUS

CROSS REFERENCE TO RELATED APPLICATIONS

The present disclosure is a national phase entry of International Patent Application No. PCT/CN2020/107050 filed Aug. 5, 2020, which claims the priority to a Chinese patent application No. 201910718635.8 filed with the China National Intellectual Property Administration on Aug. 5, 2019 and entitled "SLIDE STORAGE METHOD AND APPARATUS". Both of the above-mentioned applications are incorporated herein by reference in their entireties.

TECHNICAL FIELD

This application relates to the field of computer technology, and in particular to a method and apparatus for storing slides.

BACKGROUND

The slide show is a way to display a presentation file, and used to share the content of the presentation file with an audience. To meet the requirements for showing different slides in the presentation file in different occasions, the presentation file may include custom show information. When the custom show function for the presentation file is turned on, users may select slides to be shown from the presentation file based on their own needs, and adjust the sequencing of the slide show to obtain the custom show information.

When a user needs to store slides and obtains a presentation file matching the custom show information, the user may achieve these in two ways. In one way: the user may manually copy the slide data corresponding to the slides contained in the custom show information to a new presentation file based on the show sequence of the slides, and store the new presentation file. In another way: the user may delete the slide data of redundant slides in the presentation file, and store the presentation file after deleting the slide data, where the redundant slides are slides in the presentation file that are not contained in the custom show information. Only the slide data of the slides contained in the custom show information are stored in the presentation file matching the custom show information, and the show sequence of the slides in the presentation file matching the custom show information is identical to the show sequence contained in the custom show information.

As for the two ways for storing slides mentioned above, no matter which way is used to store the slides to obtain the presentation file matching the custom show information, the user needs to perform a lot of operations, resulting in low efficiency for storing slides and poor user experience.

SUMMARY

The purpose of the embodiments of the present disclosure is to provide a method and an apparatus for storing slides, so as to reduce operations performed by the user, increase storage efficiency for the slides and improve user experience when obtaining the presentation file matching the custom show information. The implemented technical solution is as follows.

In a first aspect, for the purpose mentioned above, an embodiment of the present disclosure provides a method for storing slides, which includes steps of:

receiving a save-as instruction for target custom show information generated in a first presentation file; where, the target custom show information includes slides selected from the first presentation file and a show sequence of the selected slides;

acquiring property information of a second presentation file based on the save-as instruction; and extracting, based on the property information and based on the show sequence, slide data corresponding to the selected slides from the first presentation file and storing the extracted slide data in the second presentation file.

Optionally, receiving the save-as instruction for target custom show information generated in the first presentation file includes:

receiving a select instruction from a user for first custom show information generated in the first presentation file; and responsive to detecting a save-as operation for the custom show information input by the user, taking the first custom show information as the target custom show information and determining reception of the save-as instruction for the target custom show information generated in the first presentation file.

Optionally, receiving the save-as instruction for target custom show information generated in the first presentation file includes:

responsive detecting a save-all-as operation for the custom show information input by the user, taking all pieces of custom show information generated in the first presentation file as the target custom show information and determining reception of the save-as instruction for the target custom show information generated in the first presentation file;

acquiring the property information of the second presentation file based on the save-as instruction includes:

for each of pieces of the target custom show information, acquiring the property information of the second presentation file corresponding to the piece of target custom show information; and extracting, based on the property information and based on the show sequence, slide data corresponding to the selected slides from the first presentation file and storing the extracted slide data in the second presentation file includes:

for each of the pieces of the target custom show information, extracting, based on the property information of the second presentation file corresponding to the piece of target custom show information and based on the show sequence contained in the piece of target custom show information, the slide data corresponding to the slides contained in the piece of target custom show information from the first presentation file, and storing the extracted slide data in the second presentation file corresponding to the piece of target custom show information.

Optionally, for each of the pieces of target custom show information, extracting, based on the property information of the second presentation file corresponding to the piece of target custom show information and based on the show sequence contained in the piece of target custom show information, the slide data corresponding to the slides contained in the piece of target custom show information from the first presentation file, and storing the extracted slide data in the second presentation file corresponding to the piece of target custom show information includes:

sequentially selecting, based on a preset storing sequence, a piece of target custom show information from all the pieces of target custom show information; extracting the slide data corresponding to the slides contained in the selected piece of target custom show information from the first presentation file, based on the property information of the second presentation file corresponding to the selected piece of target custom show information and based on the show sequence contained in the selected piece of target custom show information; and storing the extracted slide data in the second presentation file corresponding to the selected piece of target custom show information;

where, the preset storing sequence is: a sequence of a generation time of each of the pieces of custom show information from early to later, a sequence of a number of slides contained in each of the pieces of custom show information from more to less, a sequence of a number of times that the slides contained in each of the pieces of custom show information are shown from more to less, a sequence of a consumption duration for generating each of the pieces of custom show information from long to short, a sequence of a modification time of each of the pieces of custom show information from early to later, or a sequence of a number of times that each of the pieces of custom show information is modified from more to less.

Optionally, the method further includes:

for each of the pieces of target custom show information, if a cancel instruction is received during performing an operation for storing the slides of the piece of target custom show information, then:

cancelling the performance of the operation for storing the slides of the piece of target custom show information, or cancelling the performance of the operation for storing the slides of the piece of target custom show information, and cancelling a non-performed operation for storing slides, or cancelling the performance of the operation for storing the slides of the piece of target custom show information, cancelling a non-performed operation for storing the slides, and deleting the second presentation file obtained from a performed operation for storing the slides;

where, the operation for storing the slides includes: based on the show sequence contained in each of the pieces of target custom show information, extracting the slide data corresponding to the slides contained in the piece of target custom show information from the first presentation file and storing the extracted slide data in the second presentation file corresponding to the piece of target custom show information.

Optionally, acquiring the property information of the second presentation file based on the save-as instruction includes:

displaying a save-as dialog box based on the save-as instruction; and receiving the property information of the second presentation file input by the user into the save-as dialog box.

Optionally, the property information includes a storage location, a file name and a file format.

In a second aspect, for the purpose mentioned above, an embodiment of the present disclosure provides an apparatus for storing slides, including:

a receiving module, configured for receiving a save-as instruction for target custom show information generated in a first presentation file; where, the target custom show information includes slides selected from the first presentation file and a show sequence of the selected slides;

an acquiring module, configured for acquiring, based on the save-as instruction, property information of a second presentation file; and an extracting module, configured for extracting, based on the property information and based on the show sequence, slide data corresponding to the selected slides from the first presentation file and storing the extracted slide data in the second presentation file.

Optionally, the receiving module is further configured for:

receiving a select instruction from a user for first custom show information generated in the first presentation file; and when a save-as operation for the custom show information input by the user is detected, taking the first custom show information as the target custom show information and determining reception of the save-as instruction for the target custom show information generated in the first presentation file.

Optionally, when a save-all-as operation for the custom show information input by the user is detected, the receiving module is further configured for taking all pieces of custom show information generated in the first presentation file as the target custom show information and determining reception of the save-as instruction for the target custom show information generated in the first presentation file;

the acquiring module is further configured for, for each of pieces of the target custom show information, acquiring the property information of the second presentation file corresponding to the piece of target custom show information; and the extracting module is further configured for, for each of the pieces of the target custom show information, extracting, based on the property information of the second presentation file corresponding to the piece of target custom show information and based on the show sequence contained in the piece of target custom show information, the slide data corresponding to the slides contained in the piece of target custom show information from the first presentation file, and storing the extracted slide data in the second presentation file corresponding to the piece of target custom show information.

Optionally, the extracting module is further configured for sequentially selecting, based on a preset storing sequence, a piece of target custom show information from all the pieces of target custom show information; extracting the slide data corresponding to the slides contained in the selected piece of target custom show information from the first presentation file, based on the property information of the second presentation file corresponding to the selected piece of target custom show information and based on the show sequence contained in the selected piece of target custom show information; and storing the extracted slide data in the second presentation file corresponding to the selected piece of target custom show information;

where, the preset storing sequence is one of: a sequence of a generation time of each of the pieces of custom show information from early to later, a sequence of a number of slides contained in each of the pieces of custom show information from more to less, a sequence of a number of times that the slides contained in each of the pieces of custom show information are shown from more to less, a sequence of a consumption duration for generating each of the pieces of custom show information from long to short, a sequence of a modification time of each of the pieces of custom show information from early to later, and a sequence of a number of times that each of the pieces of custom show information is modified from more to less.

Optionally, the receiving module is further configured for, for the each of the pieces of target custom show information, if a cancel instruction is received during performing an operation for storing the slides of the piece of target custom show information, then:

cancelling the performance of the operation for storing the slides of the piece of target custom show information, or cancelling the performance of the operation for storing the slides of the piece of target custom show information, and cancelling a non-performed operation for storing slides, or cancelling the performance of the operation for storing the slides of the piece of target custom show information, cancelling a non-performed operation for storing the slides, and deleting the second presentation file obtained from a performed operation for storing the slides;

where, the operation for storing the slides includes: based on the show sequence contained in each of the pieces of target custom show information, extracting the slide data corresponding to the slides contained in the piece of target custom show information from the first presentation file and storing the extracted slide data in the second presentation file corresponding to the piece of target custom show information.

Optionally, the acquiring module is further configured for:

displaying a save-as dialog box based on the save-as instruction;

receiving the property information of the second presentation file input by the user into the save-as dialog box.

Optionally, the property information includes a storage location, a file name and a file format.

In a third aspect, an embodiment of the present disclosure provides an electronic device, including a processor, a communication interface, a memory and a communication bus; where, the processor, the communication interface and the memory communicate with each other via the communication bus;

the memory is configured for storing a computer program; and the processor is configured for, when executing the computer program stored in the memory, performing operations of the method in the first aspect.

In a fourth aspect, an embodiment of the present disclosure provides a computer-readable storage medium, storing computer programs, where, when the computer program is executed by a processor, the processor performs operations of the method in the first aspect are implemented.

In a fifth aspect, an embodiment of the present disclosure provides a computer program product including instructions; where when the computer program product is executed by a computer, the computer is caused to perform steps of the method in the first aspect.

In a sixth aspect, an embodiment of the present disclosure provides a computer program; where, when the computer program is executed by a computer, the computer performs steps of the method in the first aspect are implemented.

The beneficial effects of the embodiments of the present disclosure is: in the method and apparatus for storing slides provided in the embodiments of the present disclosure, a save-as instruction for target custom show information generated in a first presentation file is received, where the target custom show information includes slides selected from the first presentation file and a show sequence of the selected slides; property information of a second presentation file is acquired based on the save-as instruction; based on the property information of the second presentation file and based on the show sequence of the slides of the target custom show information, the slide data corresponding to the selected slides is extracted from the first presentation file, and the extracted slide data is stored in the second presentation file. Based on the technical solution according to the embodiment of the present disclosure, the user only needs to input one save-as instruction to obtain a presentation file matching the custom show information, thus reducing the operations performed by the user, increasing the efficiency for storing the slides, and improving the user experience.

Naturally, any product or method for implementing the present disclosure does not necessarily need to achieve all the advantages described above at the same time.

BRIEF DESCRIPTION OF THE DRAWINGS

In order to explain technical solutions in the embodiments of the present disclosure and in the prior art more clearly, the drawings used in the description of the prior art or the embodiments will be described briefly in the following. It is apparent that the drawings in the description below are only some embodiments of the present disclosure and those skilled in the art can obtain other drawings based on these drawings without inventive efforts.

DETAILED DESCRIPTION OF THE INVENTION

Technical solutions of the present disclosure will be described clearly and completely below with reference to the drawings in the embodiments of the present disclosure. It is apparent that the described embodiments are only part, not all of the embodiments of the present disclosure. All other embodiments obtained by those skilled in the art without inventive efforts are within the scope of protection of the present disclosure based on the embodiments of the present disclosure.

The custom show information (i.e., user-defined show information or show information made according to user's order) includes slides and a show sequence of the slides. There are one or more slides contained in the custom show information. A presentation file matching the custom show information only stores slide data of the slides contained in the custom show information, and the show sequence of the slides in the presentation file matching the custom show information is identical to the show sequence contained in the custom show information.

When storing the slides to obtain the presentation file matching the custom show information, in order to reduce the operation performed by the user, increase the storage efficiency for slides, and improve user experience, embodiments of the present disclosure provide a method of storing slides, which may be applied to an electronic device; where the electronic device may be a PC (Personal Computer) terminal, a mobile terminal, and the like. The electronic device may be installed with a presentation application, and also may be connected to a device installed with the presentation application, where the presentation application is used for showing presentation files.

Figure 1:
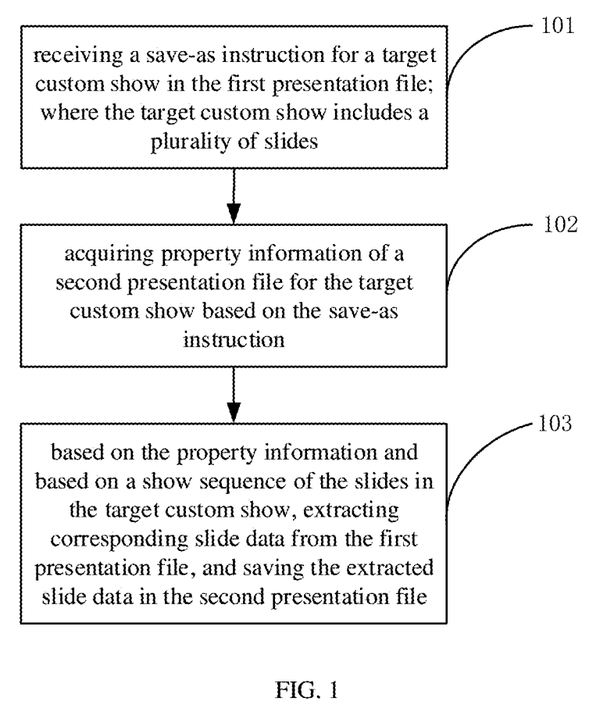
FIG. 1 is a flowchart of a method for storing slides according to an embodiment of the present disclosure.

In the following, a method for storing slides according to the embodiments of the present disclosure will be described in detail in combination with specific embodiments. For ease of understanding, in the following embodiments, that the custom show information includes a number of slides is taken as an example, and an electronic device is used as the executor for description, which is not limited. As shown in FIG. 1, the specific steps of storing slides are as follows.

At step 101, a save-as instruction for target custom show information in a first presentation file is received, where the target custom show information includes a number of slides and a show sequence of the slides.

The step 101 includes: receiving the save-as instruction for target custom show information generated in the first presentation file, where the target custom show information includes the slides selected from the first presentation file and the show sequence of the selected slides.

In the embodiment of the present disclosure, a user may select a presentation file that needs to be opened from an electronic device. After detecting the presentation file selected by the user, the electronic device operates the presentation file in the foreground. For the presentation file operated in the foreground of the electronic device, the user may make a click action on a custom show button in the presentation file. The electronic device displays an editing dialog box for the custom show information based on the user's operation of clicking the custom show button. In the editing dialog box, the user selects the slides that need to be added into the custom show information and the show sequence of all the slides. The electronic device adds the slides selected by the user and the show sequence of all the slides into the custom show information.

The first presentation file can be any presentation file in the electronic device, and here the first presentation file is taken as an example for description without limitation. There are one or more pieces of target custom show information generated in the first presentation file. The user may directly input the save-as instruction for the target custom show information into the electronic device, or may input the save-as instruction for the target custom show information into the electronic device via other devices, which are not specifically limited, where the other devices can be keyboards, mice, and the like.

When slides need to be stored to obtain a presentation file matching the target custom show information, the user inputs the save-as instruction for the target custom show information in the first presentation file into the electronic device. The electronic device receives the save-as instruction input by the user.

Figure 2:
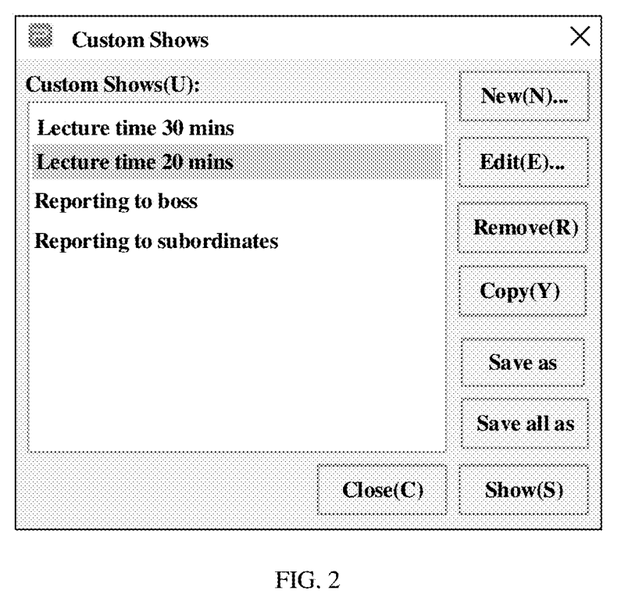
FIG. 2 is a schematic diagram of an editing dialog box for custom show information according to an embodiment of the present disclosure.

In an optional embodiment, the main menu of the presentation application may include a save-as button or a save-all-as button for the custom show information. In another optional embodiment, the editing dialog box for the custom show information includes the save-as button and the save-all-as button for the custom show information, such as the editing dialog box for the custom show information shown in FIG. 0.2. The save-as button and the save-all-as button mentioned above are configured for instructing the electronic device to perform the operation for storing the slides. The operation for storing the slides includes: based on the show sequence contained in the target custom show information, extracting the slide data corresponding to the slides contained in the target custom show information from the first presentation file and storing the same in a second presentation file corresponding to the target custom show information, which is the operation of storing the slides to obtain the presentation file matching the target custom show information in general.

Based on the save-as button and the save-all-as button for the custom show information, the electronic device may acquire the save-as instruction for the target custom show information by the following ways.

In one way, the user inputs a select instruction for first custom show information generated in the first presentation file into the electronic device, and clicks the save-as button for the custom show information. After the electronic device receives the select instruction, if the user's operation of clicking the save-as button for the custom show information is detected, the electronic device takes the first custom show information as the target custom show information, and determines reception of the save-as instruction for the target custom show information. It should be understood that, if the user's operation of clicking the save-as button for the custom show information is detected, the electronic device may take the user's operation of clicking the save-as button as the save-as instruction.

The editing dialog box for the custom show information shown in FIG. 2 is taken as an example for description. The user selects custom show information 1 entitled "Lecture time 20 mins" by a clicking action. After the user's operation of clicking custom show information 1 is detected, the electronic device determines reception of the select instruction for custom show information 1. After that, if the user clicks the save-as button in the editing dialog box for the custom show information, the electronic device will detect the user's operation of clicking the save-as button, and then determine reception of the save-as instruction for custom show information 1.

In another way: the user clicks the save-all-as button for the custom show information. If the user's operation of clicking the save-all-as button for the custom show information is detected, no matter whether the user inputs a select instruction for a certain piece of custom show information, the electronic device will take all pieces of custom show information generated in the first presentation file as the target custom show information, and determine reception of the save-as instruction for the target custom show information.

In this case, if there is one piece of custom show information generated in the first presentation file, there is one piece of target custom show information; if there are a number of pieces of custom show information generated in the first presentation file, there are a number of pieces of target show information.

The editing dialog box for the custom show information shown in FIG. 2 is still taken as an example for description. If the user clicks the save-all-as button in the editing dialog box for the custom show information, the electronic device will detect the user's operation of clicking the save-all-as button, and then take custom show information 1 entitled "Lecture time 20 mins", custom show information 2 entitled "Lecture time 30 mins", custom show information 3 entitled "Reporting to the boss", and custom show information 4 entitled "Reporting to the subordinate" as the target custom show information, and determine reception of the save-as instruction for the custom show information 1 to 4.

In another optional embodiment, the electronic device may acquire the save-as instruction for the target custom show information by the following ways.

In one way: the user inputs a select instruction for the first custom show information generated in the first presentation file into the electronic device, and inputs the save-as operation for the custom show information. After the electrical device receives the select instruction, if the save-as operation for the custom show information input by the user is detected, the electrical device takes the first custom show information as the target custom show information, and determines reception of the save-as instruction for the target custom show information.

In another way: the user inputs the save-all-as operation for the custom show information into the electronic device. If the save-all-as operation for the custom show information input by the user is detected, the electronic device takes all pieces of the custom show information generated in the first presentation file as the target custom show information, and determines reception of the save-as instruction for the target custom show information.

For the save-as operation and the save-all-as operation, the user may input the two operations into the electronic device by inputting preset characters. For example, the preset characters are Ctrl+S or Ctrl+A, etc., which is not limited.

At step 102, property information of a second presentation file for storing the target custom show information is acquired based on the save-as instruction.

The step 102 further includes: acquiring the property information of the second presentation file based on the save-as instruction. The second presentation file is configured for storing the slide data corresponding to the slides contained in the target custom show information.

In an optional embodiment, the save-as instruction is obtained from the save-all-as operation input by the user, and for each piece of target custom show information, the property information of the second presentation file corresponding to the piece of target custom show information is acquired.

In the embodiment of the present disclosure, the property information may include a storage location, a file name and a file format, etc. The storage location may include the storage path for the second presentation file, etc. The file format is the file type. After receiving the save-as instruction, the electronic device acquires the property information of the second presentation file.

In an optional embodiment, after receiving the save-as instruction, the electronic device determines the property information of the second presentation file, based on the name of the target custom show information and the property information of the first presentation file.

For example, after receiving the save-as instruction, the electronic device acquires the name of the target custom show information as the name of the second presentation file, acquires the storage location of the first presentation file as the storage location of the second presentation file, acquires the file type of the first presentation file as the file type of the second presentation file, and then obtains the property information of the second presentation file.

In the embodiment of the present disclosure, if there are a number of pieces of target custom show information, for each of the pieces of target custom show information, the electronic device determines the property information of the second presentation file corresponding to the piece of target custom show information based on the name of the piece of target custom show information and the property information of the first presentation file; where the second presentation file is configured for storing the slide data corresponding to the slides contained in the piece of target custom show information.

Figure 3:
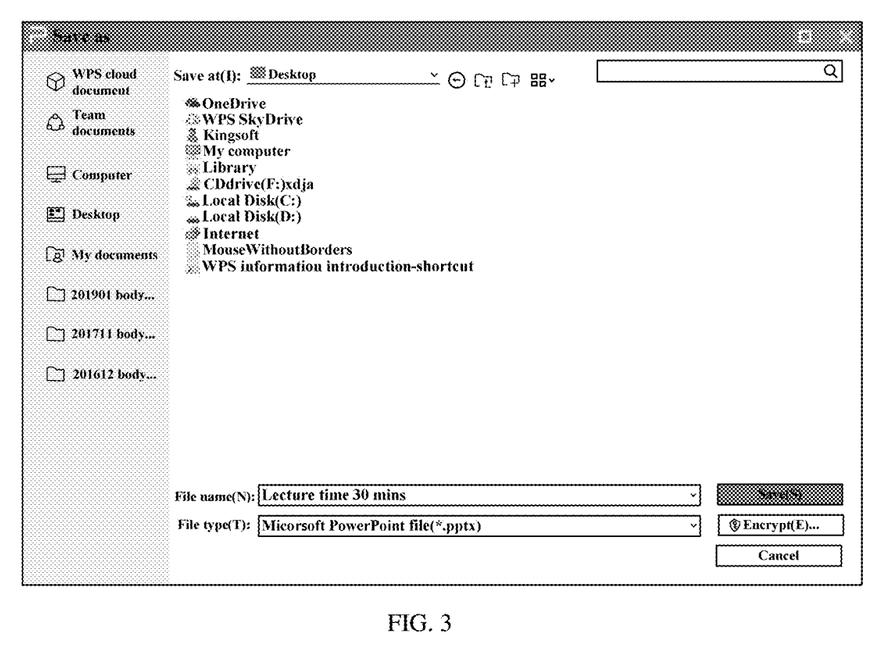
FIG. 3 is a schematic diagram of a save-as dialog box for a presentation file according to an embodiment of the present disclosure.

In another optional embodiment, after receiving the save-as instruction, the electronic device displays the save-as dialog box based on the save-as instruction. The user inputs the property information of the second presentation file into the save-as dialog box. The electronic device receives the property information of the second presentation file input by the user.

The editing dialog box for the custom show information shown in FIG. 2 is still taken as an example for description. The electronic device receives the save-as instruction for custom show information 1 entitled "Lecture time 20 mins", and displays the save-as dialog box based on the save-as instruction, as shown in FIG. 3. The user inputs the property information, such as the storage location, the file name and the file format, etc., of the second presentation file into the save-as dialog box. The electronic device receives the property information of the second presentation file input by the user.

Moreover, if the user clicks on the save-all-as button for the custom show information, or the user inputs the save-all-as operation for the custom show information, after the save-as dialog box is displayed, the user may input the property information, such as the storage location and the file type, etc., of the second presentation file into the save-as dialog box. For each piece of target custom show information, the electronic device determines the name of the piece of target custom show information as the file name of the second presentation file for storing the piece of target custom show information, and in combination with the property information input by the user, the electronic device determines the property information of the second presentation file for storing the each piece of target custom show information.

In the embodiment of the present disclosure, if the user clicks the save-all-as button for the custom show information or the user inputs the save-all-as operation for the custom show information, for each piece of target custom show information, the electronic device may display one save-as dialog box respectively, as shown in FIG. 3; the electronic device may also display only one save-all-as dialog box, in which the user may custom-modify other property information of the second presentation file except for the name of the second presentation file, where the name of the second presentation file is the name of the corresponding target custom show information.

At step 103, based on the property information and based on the show sequence of the slides in the custom show, the corresponding slide data is extracted from the first presentation file and the corresponding slide data is stored in the second presentation file.

The step 103 further includes: based on the property information and based on the show sequence of the slides in the target custom show information, extracting the corresponding slide data from the first presentation file, and storing the corresponding slide data in the second presentation file to obtain the second presentation file matching the target custom show information.

In the embodiment of the present disclosure, based on the acquired property information for the second presentation file and based on the show sequence of the slides in the target custom show information, the electronic device may extract the slides contained in the target custom show from the first presentation file, and stores the extracted slides in the second presentation file.

The editing dialog box for the custom show information shown in FIG. 2 is still taken as an example for description. The electronic device receives the save-as instruction for custom show information 1 entitled "Lecture time 20 mins", and displays the save-as dialog box based on the save-as instruction, as shown in FIG. 3. The user inputs the property information, such as the storage location, the file name and the file type, etc., of the second presentation file into the dialog box, and clicks on the save-as button. If the electronic device receives the property information of the second presentation file input by the user and the user's operation of clicking the save-as button is detected, then based on the property information of the second presentation file and based on the show sequence of the slides in the target custom show information, the electronic device extracts the slide data corresponding to the slides contained in the target custom show information from the first presentation file, and stores the extracted slide data in the second presentation file.

In an optional embodiment, the save-as instruction is obtained from the save-all-as operation input by the user, and the above step 103 may specifically include: for each piece of target custom show information, based on the property information of the second presentation file corresponding to the piece of target custom show information and based on the show sequence contained in the piece of target custom show information, extracting the slide data corresponding to the slides contained in the piece of target custom show information from the first presentation file, and storing the slide data in the second presentation file corresponding to the piece of target custom show information.

In one example, for each piece of target custom show information, the electronic device generates the second presentation file corresponding to the piece of target custom show information based on the property information of the second presentation file corresponding to the piece of target custom show information, and extracting the slide data corresponding to the slides contained in the piece of target custom show information from the first presentation file based on the show sequence of the slides in the piece of target custom show information, and storing the extracted slide data in the second presentation file corresponding to the piece of target custom show information. In this way, the second presentation file matching the piece of target custom show information may be obtained, ensuring that the show sequence of the slides in the second presentation file is identical to the show sequence of the slides contained in the piece of target custom show information.

For example, the target custom show information may include custom show information 11 and 12. A second presentation file corresponding to custom show information 11 is presentation file 11, and a second presentation file corresponding to custom show information 12 is presentation file 12. Custom show information 11 includes slides 1, 2 and 3, and the show sequence of the slides 1, 2 and 3 is: slide 1→slide 2→slide 3. Custom show information 12 includes slides 4, 5 and 6, and the show sequence of the slides 4, 5 and 6 is: slide 4→slide 5→slide 6.

The electronic device extracts the slide data corresponding to slide 1, the slide data corresponding to slide 2 and the slide data corresponding to slide 3 from early to later, and stores the slide data corresponding to slide 1, slide data corresponding to slide 2 and the slide data corresponding to slide 3 into the presentation file 11, to obtain presentation file 11 matching custom show information 11; and the electronic device extracts the slide data corresponding to slide 4, slide data corresponding to slide 5 and the slide data corresponding to slide 6 sequentially, and stores the slide data corresponding to slide 4, the slide data corresponding to slide 5 and the slide data corresponding to slide 6 into presentation file 12, to obtain presentation file 12 matching custom show information 12. After that, the electronic device may show presentation file 11 based on the sequence: slide 1→slide 2→slide 3, and may show the presentation file 12 based on the sequence: slide 4→slide 5→slide 6.

In an optional embodiment, if the save-as instruction is obtained from the save-all-as operation input by the user, the electronic device may set a storing sequence in advance (i.e. a preset storing sequence), and select a piece of target custom show information from all the pieces of target custom show information sequentially based on the preset storing sequence, and extract the slide data corresponding to the slides contained in the selected piece of target custom show information from the first presentation file based on the property information of the second presentation file corresponding to the selected piece of target custom show information and based on the show sequence contained in the selected piece of target custom show information, and store the extracted slide data in the second presentation file corresponding to the selected piece of target custom show information.

In one example, the preset storing sequence may be: a sequence of the generation time of each of the pieces of custom show information from early to later.

For example, the target custom show information includes custom show information 11 and 12. The second presentation file corresponding to custom show information 11 is presentation file 11, and the second presentation file corresponding to custom show information 12 is presentation file 12. Custom show information 11 includes slides 1, 2 and 3, and custom show information 12 includes slides 4, 5 and 6. Where the generation time of custom show information 11 is 10:00, and the generation time of custom show information 12 is 11:00, and the generation time of custom show information 11 is earlier than the generation time of the custom show information 12, then:

the electronic device sequentially extracts the slide data corresponding to slide 1, the slide data corresponding to slide 2 and the slide data corresponding to slide 3, and stores the slide data corresponding to slide 1, the slide data corresponding to slide 2 and the slide data corresponding to slide 3 into the presentation file 11 sequentially, to obtain presentation file 11 matching custom show information 11;

after obtaining presentation file 11 matching custom show information 11, the electronic device extracts the slide data corresponding to slide 4, the slide data corresponding to slide 5 and the slide data corresponding to slide 6 from early to later, and stores the slide data corresponding to slide 4, the slide data corresponding to slide 5 and the slide data corresponding to slide 6 into presentation file 12 sequentially, to obtain presentation file 12 matching custom show information 12.

In the embodiment of the present disclosure, the electronic device may further extract the slide data with multiple threads to obtain the second presentation file matching each piece of target custom show information, which specifically is as follows.

For example, the electronic device may further extract the slide data simultaneously with 2 threads: threads 1 and 2, respectively. The target custom show information includes custom show information 11, 12 and 13. The generation time of custom show information 11 is 10:00, the generation time of custom show information 12 is 11:00, and the generation time of custom show information 13 is 12:00; and the generation time of custom show information 11 is earlier than that of custom show information 12, and the generation time of custom show information 12 is earlier than that of custom show information 13.

Accordingly, the electronic device extracts the slide data corresponding to the slides contained in custom show information 11 with one thread (such as thread 1) and stores the extracted slide data in presentation file 11 sequentially, so as to obtain presentation file 11 matching custom show information 11; at the same time the electronic device extracts the slide data corresponding to the slides contained in custom show information 12 with another thread (such as thread 2) and stores the extracted slide data in presentation file 12 sequentially, so as to obtain presentation file 12 matching custom show information 12.

When extracting the slide data corresponding to the slides contained in custom show information 12 with one thread (such as the thread 2) ends, the slide data corresponding to the slides contained in the custom show information (i.e. custom show information 13) for which the operation of storing the slides is not performed is extracted with the thread 2, and the extracted slide data is stored in presentation file 13 sequentially, to obtain presentation file 12 matching custom show information 13.

In the embodiment of the present disclosure, the preset storing sequence may further include: the sequence of the number of slides contained in each of the pieces of custom show information from more to less; the preset storing sequence may further be: the sequence of the number of times that the slides contained in each of the pieces of custom show information are shown from more to less; the preset storing sequence may further be: the sequence of the consumption duration for generating each of the pieces of custom show information from long to short; the preset storing sequence may further be: the sequence of the modification time of each of the pieces of custom show information from early to later; the preset storing sequence may further be: the sequence of the number of times that each of the pieces of custom show information is modified from more to less, which is not specifically limited.

In an optional embodiment, if the save-as instruction is obtained from the save-all-as operation input by the user, the electronic device may select a piece of target custom show information from all pieces of the target custom show information sequentially, based on the preset storing sequence; acquire the property information of the second presentation file corresponding to the selected piece of target custom show information; and based on the property information of the second presentation file corresponding to the selected piece of target custom show information and based on the show sequence contained in the selected piece of target custom show information, extract the slide data corresponding to the slides contained in the selected piece of target custom show information from the first presentation file and store the extracted slide data in the second presentation file corresponding to the selected piece of target custom show information.

For example, the target custom show information includes custom show information 11 and 12. The second presentation file corresponding to custom show information 11 is presentation file 11, and the second presentation file corresponding to custom show information 12 is presentation file 12, where the generation time of custom show information 11 is 10:00, the generation time of custom show information 12 is 11:00, and the generation time of custom show information 11 is earlier than that of the custom show information 12, then:

the electronic device displays save-as dialog box 1 for custom show information 11, and the user inputs the property information of presentation file 11 into save-as dialog box 1. After receiving the property information of presentation file 11 input by the user, the electronic device extracts the slide data corresponding to slide 1, the slide data corresponding to slide 2, and the slide data corresponding to slide 3, and stores the slide data corresponding to slide 1, the slide data corresponding to slide 2 and the slide data corresponding to slide 3 in the presentation file 11 sequentially, to obtain presentation file 11 matching custom show information 11;

after obtaining presentation file 11 matching custom show information 11, the electronic device displays save-as dialog box 2 for custom show information 12, and the user inputs the property information of presentation file 12 into save-as dialog box 2. After receiving the property information of presentation file 12 input by the user, the electronic device extracts the slide data corresponding to slide 4, the slide data corresponding tong slide 5, and the slide data corresponding to slide 6, and stores the slide data corresponding to slide 4, the slide data corresponding to slide 5, and the slide data corresponding to slide 6 in presentation file 12 sequentially, to obtain presentation file 12 matching custom show information 12.

In an optional embodiment, if the save-as instruction is obtained from the save-all-as operation input by the user, for each piece of target custom show information, if a cancel instruction is received during performing an operation for storing the slides of the piece of target custom show information, the electronic device cancels the performance of the operation for storing the slides of the target custom show information, where the operation for storing the slides includes: based on the show sequence contained in each of the pieces of target custom show information, extracting the slide data corresponding to the slides contained in the piece of target custom show information from the first presentation file and storing the extracted slide data in the second presentation file corresponding to the piece of target custom show information.

For example, the target custom show information includes custom show information 11, 12 and 13. The second presentation file corresponding to custom show information 11 is presentation file 11, the second presentation file corresponding to custom show information 12 is presentation file 12, and the second presentation file corresponding to custom show information 13 is presentation file 13. If a cancel instruction is received during performing an operation for storing the slides of custom show information 12, the electronic device cancels the performance of the operation for storing the slides of custom show information 12, that is, the electronic device does not generate presentation file 12 matching custom show information 12.

In an optional embodiment, if the save-as instruction is obtained from the save-all-as operation input by the user, for each piece of target custom show information, if a cancel instruction is received during performing an operation for storing the slides of the piece of target custom show information, the electronic device may cancel the performance of the operation for storing the slides of the piece of target custom show information, and cancel the non-performed operation for storing slides.

For example, if a cancel instruction is received during performing the operation for storing the slides of custom show information 12, and at this time, the operation for storing the slides of custom show information 11 has been performed, and the operation for storing the slides of custom show information 13 is not performed, the electronic device cancels the performance of the operation for storing the slides of custom show information 12 and cancels the performance of the operation for storing the slides of custom show information 13.

In another optional embodiment, if the save-as instruction is obtained from the save-all-as operation input by the user, for each piece of target custom show information, if a cancel instruction is received during performing the operation for storing the slides of the piece of target custom show information, the electronic device cancels the performance of the operation for storing the slides of the piece of target custom show information, cancels the non-performed operation for storing slides, and deletes the second presentation file obtained from the performed operation for storing the slides.

For example, if a cancel instruction is received during performing the operation for storing the slides of custom show information 12, and at this time, the operation for storing custom show information 11 has been performed, that is, presentation file 11 matching custom show information 11 has been obtained, and the operation for storing the slides of the custom show information 13 is not yet performed, the electronic device cancels the performance of the operation storing the slides of custom show information 12, and cancels the performance of the operation for storing the slides of custom show information 13, and deletes presentation file 11.

An embodiment of the present disclosure provides a method for storing slides. The electronic device receives a save-as instruction for target custom show information in a first presentation file, where the target custom show information includes a number of slides and a show sequence of the number of slides; acquires the property information of the second presentation file based on the save-as instruction; and based on the property information of the second presentation file and based on the show sequence of the slides in the target custom show information, extracts the slide data corresponding to the slides contained in the target custom show information from the first presentation file, and stores the extracted slide data in the second presentation file. Based on the technical solution according to the embodiment of the present disclosure, the user may need to input only one save-as instruction to obtain a presentation file matching the custom show information, thus reducing the operations performed by the user, increasing the efficiency for storing the slides, and improving the user experience.

Figure 4:
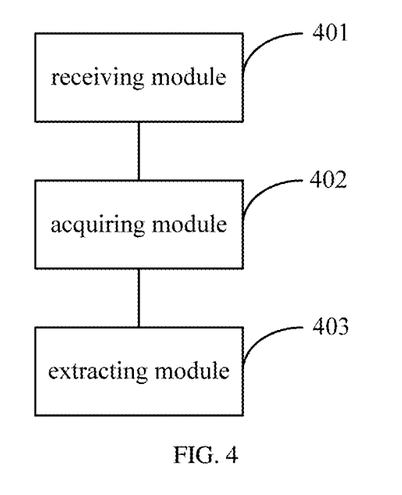
FIG. 4 is a schematic structural diagram of an apparatus for storing slides according to an embodiment of the present disclosure.

Based on the same technical construction, an embodiment of the present disclosure provides an apparatus for storing slides. As shown in FIG. 4, The apparatus includes:

a receiving module 401, configured for receiving a save-as instruction for target custom show information in a first presentation file, where the target custom show information includes a number of slides and a show sequence of the number of slides;

an acquiring module 402, configured for acquiring property information of a second presentation file based on the save-as instruction, where the second presentation file is configured for storing slide data corresponding to the plurality of slides; and an extracting module 403, configured for, based on the property information of the second presentation file and based on the show sequence of the slides in the target custom show information, extracting slide data corresponding to the number of slides contained in the target custom show information from the first presentation file, and storing the extracted slide data in the second presentation file.

In one embodiment, the receiving module 401 may be further configured for:

receiving a select instruction from the user for the first custom show information in the first presentation file;

taking the first custom show information as the target custom show information and determining reception of the save-as instruction for the target custom show information in the first presentation file, when the user's operation of clicking on the save-as button for the custom show information is detected.

In one embodiment, the receiving module 401 may be further configured for:

taking all pieces of custom show information in the first presentation file as the target custom show information and determining reception of the save-as instruction for the target custom show information in the first presentation file, when the user's operation of clicking on the save-all-as button for the custom show information is detected.

In one embodiment, the acquiring module 402 may be further configured for:

displaying a save-as dialog box according to the save-as instruction;

receiving the property information of the second presentation file input by the user into the save-as dialog box.

In one embodiment, the property information includes a storage location, a file name and a file format.

An embodiment of the present disclosure provides an apparatus for storing slides. The electronic device receives a save-as instruction for target custom show information in a first presentation file, where the target custom show information includes a number of slides and a show sequence of the number of slides; acquires the property information of the second presentation file based on the save-as instruction; and based on the property information of the second presentation file and based on the show sequence of the slides in the target custom show information, extracts the slide data corresponding to the slides contained in the target custom show information from the first presentation file, and stores the extracted slide data in the second presentation file. Based on the technical solution according to the embodiment of the present disclosure, the user may need to input only one save-as instruction to obtain a presentation file matching the custom show information, thus reducing the operations performed by the user, increasing the efficiency for storing the slides, and improving the user experience.

Based on the same technical construction, the embodiment of the present disclosure provides an apparatus for storing slides. The apparatus includes:

a receiving module, configured for receiving a save-as instruction for target custom show information generated in a first presentation file; where, the target custom show information includes slides selected from the first presentation file and a show sequence of the selected slides;

an acquiring module, configured for acquiring property information of a second presentation file based on the save-as instruction; and an extracting module, configured for, based on the property information and based on the show sequence, extracting slide data corresponding to the selected slides from the first presentation file and storing the extracted slide data in the second presentation file.

In one embodiment, the receiving module may be further configured for:

receiving a select instruction from a user for first custom show information generated in the first presentation file; and taking the first custom show information as the target custom show information and determining reception of the save-as instruction for the target custom show information generated in the first presentation file, when a save-as operation for the custom show information input by the user is detected.

In one embodiment, the receiving module may be further configured for:

taking all pieces of custom show information generated in the first presentation file as the target custom show information and determining reception of the save-as instruction for the target custom show information generated in the first presentation file, when a save-all-as operation for the custom show information input by the user is detected;

the acquiring module is further configured for, for each of pieces of target custom show information, acquiring the property information of the second presentation file corresponding to the piece of target custom show information; and the extracting module is further configured for, for each of the pieces of target custom show information, based on the property information of the second presentation file corresponding to the piece of target custom show information and based on the show sequence contained in the piece of target custom show information, extracting the slide data corresponding to the slides contained in the piece of target custom show information from the first presentation file, and storing the extracted slide data in the second presentation file corresponding to the piece of target custom show information.

In one embodiment, the extracting module may be further configured for selecting a piece of target custom show information from all the pieces of target custom show information sequentially based on a preset storing sequence, and extracting the slide data corresponding to the slides contained in the selected piece of target custom show information from the first presentation file, based on the property information of the second presentation file corresponding to the selected piece of target custom show information and based on the show sequence contained in the selected piece of target custom show information, and storing the extracted slide data in the second presentation file corresponding to the selected piece of target custom show information;

where, the preset storing sequence may be: a sequence of a generation time of each of the pieces of custom show information from early to later, or a sequence of the number of slides contained in each of the pieces of custom show information from more to less, or a sequence of the number of times that the slides contained in each of the pieces of custom show information are shown from more to less, or a sequence of the consumption duration for generating each of the pieces of custom show information from long to short, or a sequence of a modification time of each of the pieces of custom show information from early to later, or a sequence of the number of times that each of the pieces of custom show information is modified from more to less.

In one embodiment, the receiving module may be further configured for, for each of the pieces of target custom show information, if a cancel instruction is received during performing an operation for storing the slides of the piece of target custom show information, then:

cancelling the performance of the operation for storing the slides of the piece of target custom show information, or cancelling the performance of the operation for storing the slides of the piece of target custom show information, and cancelling a non-performed operation for storing slides, or cancelling the performance of the operation for storing the slides of the piece of target custom show information, cancelling the non-performed operation for storing the slides, and deleting the second presentation file obtained from the performed operation for storing the slides;

where, the operation for storing the slides includes: based on the show sequence contained in each of the pieces of target custom show information, extracting the slide data corresponding to the slides contained in the piece of target custom show information from the first presentation file and storing the extracted slide data in the second presentation file corresponding to the piece of target custom show information.

Figure 5:
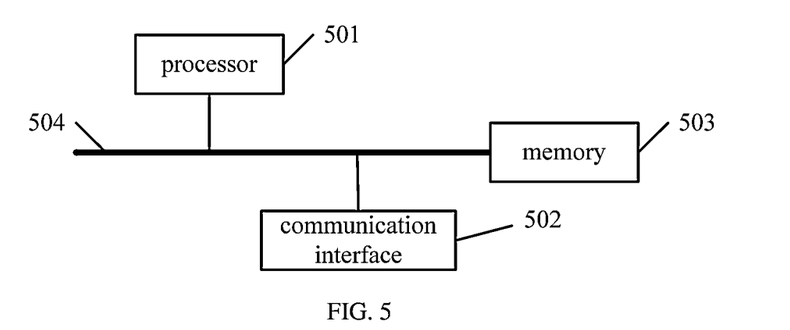
FIG. 5 is a schematic structural diagram of an electronic device according to an embodiment of the present disclosure.

Based on the same technical construction, an embodiment of the present disclosure further provides an electronic device, as shown in FIG. 5, including a processor 501, a communication interface 502, a memory 503 and a communication bus 504; where the processor 501, the communication interface 502 and the memory 503 communicate with each other via the communication bus 504;

the memory 503 is configured for storing a computer program; and the processor 501 is configured for, when executing the computer program stored in the memory 503, implementing the following steps of:

receiving a save-as instruction for target custom show information in a first presentation file; where the target custom show information includes a number of slides and a show sequence of the number of slides;

acquiring property information of a second presentation file based on the save-as instruction; where the second presentation file is configured for storing slide data corresponding to the number of slides; and based on the property information of the second presentation file and based on the show sequence of the slides in the target custom show information, extracting slide data corresponding to the slides contained in the target custom show information from the first presentation file, and storing the extracted slide data in the second presentation file.

Optionally, the step of receiving a save-as instruction for target custom show information in a first presentation file may include:

receiving a select instruction from a user for first custom show information in the first presentation file;

taking the first custom show information as the target custom show information and determining reception of the save-as instruction for the target custom show information in the first presentation file, when the user's operation of clicking the save-as button for the custom show information is detected.

Optionally, the step of receiving a save-as instruction for target custom show information in a first presentation file may include:

taking all pieces of custom show information in the first presentation file as the target custom show information and determining reception of the save-as instruction for the target custom show information in the first presentation file, when the user's operation of clicking the save-all-as button for the custom show information is detected.

Optionally, the step of acquiring property information of a second presentation file based on the save-as instruction may include:

displaying a save-as dialog box based on the save-as instruction; and receiving the property information of the second presentation file input by the user into the save-as dialog box.

Based on the same technical construction, an embodiment of the present disclosure further provides an electronic device, including a processor, a communication interface, a memory and a communication bus; where, the processor, the communication interface and the memory communicate with each other via the communication bus;

the memory is configured for storing a computer program; and the processor is configured for, when executing the computer program stored in the memory, implementing the following steps of:

receiving a save-as instruction for target custom show information generated in a first presentation file; where, the target custom show information includes slides selected from the first presentation file and a show sequence of the selected slides;

acquiring property information of a second presentation file based on the save-as instruction; and based on the property information and based on the show sequence, extracting slide data corresponding to the selected slides from the first presentation file and storing the extracted slide data in the second presentation file.

Optionally, the step of receiving a save-as instruction for target custom show information generated in a first presentation file includes:

receiving a select instruction from a user for first custom show information generated in the first presentation file; and taking the first custom show information as the target custom show information and determining reception of the save-as instruction for the target custom show information generated in the first presentation file, when a save-as operation for the custom show information input by the user is detected.

Optionally, the step of receiving a save-as instruction for target custom show information generated in a first presentation file includes:

taking all pieces of custom show information generated in the first presentation file as the target custom show information and determining reception of the save-as instruction for the target custom show information generated in the first presentation file, when a save-all-as operation for the custom show information input by the user is detected;

the step of acquiring property information of a second presentation file based on the save-as instruction includes:

for each of pieces of target custom show information, acquiring the property information of the second presentation file corresponding to the piece of target custom show information; and the step of based on the property information and based on the show sequence, extracting slide data corresponding to the selected slides from the first presentation file and storing the extracted slide data in the second presentation file includes:

for each of the pieces of target custom show information, based on the property information of the second presentation file corresponding to the piece of target custom show information and based on the show sequence contained in the piece of target custom show information, extracting the slide data corresponding to the slides contained in the piece of target custom show information from the first presentation file, and storing the extracted slide data in the second presentation file corresponding to the piece of target custom show information.

Optionally, the step of for each of the pieces of target custom show information, based on the property information of the second presentation file corresponding to the piece of target custom show information and based on the show sequence contained in the piece of target custom show information, extracting the slide data corresponding to the slides contained in the piece of target custom show information from the first presentation file, and storing the extracted slide data in the second presentation file corresponding to the piece of target custom show information includes:

selecting a piece of target custom show information from all the pieces of target custom show information sequentially based on a preset storing sequence, and extracting the slide data corresponding to the slides contained in the selected piece of target custom show information from the first presentation file, based on the property information of the second presentation file corresponding to the selected piece of target custom show information and based on the show sequence contained in the selected piece of target custom show information, and storing the extracted slide data in the second presentation file corresponding to the selected piece of target custom show information;

where, the preset storing sequence is: a sequence of a generation time of each of the pieces of custom show information from early to later, or a sequence of the number of slides contained in each of the pieces of custom show information from more to less, or a sequence of the number of times that the slides contained in each of the pieces of custom show information are shown from more to less, or a sequence of the consumption duration for generating each of the pieces of custom show information from long to short, or a sequence of a modification time of each of the pieces of custom show information from early to later, or a sequence of the number of times that each of the pieces of custom show information is modified from more to less.

Optionally, the processor may be further configured for implementing the following steps of:

for each of the pieces of target custom show information, if a cancel instruction is received during performing an operation for storing the slides of the piece of target custom show information, then:

cancelling the performance of the operation for storing the slides of the piece of target custom show information, or cancelling the performance of the operation for storing the slides of the piece of target custom show information, and cancelling a non-performed operation for storing slides, or cancelling the performance of the operation for storing the slides of the piece of target custom show information, cancelling the non-performed operation for storing the slides, and deleting the second presentation file obtained from the performed operation for storing the slides;

where, the operation for storing the slides includes: based on the show sequence contained in each of the pieces of target custom show information, extracting the slide data corresponding to the slides contained in the piece of target custom show information from the first presentation file and storing the extracted slide data in the second presentation file corresponding to the piece of target custom show information.

Optionally, the property information may include a storage location, a file name and a file format.

The embodiment of the present disclosure provides an electronic device. The electronic device receives a save-as instruction for target custom show information in a first presentation file, where the target custom show information includes a number of slides and a show sequence of the plurality of slides; acquires the property information of the second presentation file based on the save-as instruction; and based on the property information of the second presentation file and based on the show sequence of the slides in the target custom show information, extracts the slide data corresponding to the slides contained in the target custom show information from the first presentation file, and stores the extracted slide data in the second presentation file. Based on the technical solution according to the embodiment of the present disclosure, the user only needs to input one save-as instruction to obtain a presentation file matching the custom show information, which reduces the operations performed by the user, increases the efficiency for storing the slides, and improves the user experience.

The above-mentioned communication bus in the electronic device may be a Peripheral Component Interconnect (abbreviated as PCI) bus, an Extended Industry Standard Structure (abbreviated as EISA) bus, or the like. The communication bus can be divided into an address bus, a data bus, a control bus, etc. For ease of explanation, only one thick line is used in the figure, but it does not mean that there is only one bus or one type of bus.

The communication interface is configured for the communication between the above-mentioned electronic device and other devices.

The memory may include a Random Access Memory (abbreviated as RAM), and also include a Non-Volatile Memory (abbreviated as NVM), for example, at least one magnetic disk memory. Optionally, the memory may further be at least one storage apparatus located far away from the foregoing processor.

The processor may be a general purpose processor, including a Central Processing Unit (abbreviated as CPU), a Network Processor (abbreviated as NP), etc.; it may also be a Digital Signal Processing (abbreviated as DSP), an Application Specific Integrated Circuit (abbreviated as ASIC), a Field Programmable Gate Array (abbreviated as FPGA) or other programmable logic device, discrete gates or transistor logic device, discrete hardware components.

Based on the same technical construction, an embodiment of the present disclosure further provides a computer-readable storage medium storing a computer program; where, the computer program, when executed by a processor, implements steps of any aforementioned method for storing slides.

Based on the same technical construction, an embodiment of the present disclosure further provides a computer program product including instructions; where, the computer program product, when executed by a computer, causes the computer to implement steps of any aforementioned method for storing slides.

Based on the same technical construction, an embodiment of the present disclosure further provides a computer program; where, the computer program, when executed by a processor, implements steps of any aforementioned method for storing slides.

The above-mentioned embodiments may be implemented in whole or in part by software, hardware, firmware, or any combination thereof. When implemented by software, the embodiments can be implemented in whole or in part in the form of a computer program product. The computer program product includes one or more computer instructions. When the computer program instructions are loaded and executed on the computer, the processes or functions described in the embodiments of the present disclosure are generated in whole or in part. The computer may be a general-purpose computer, a dedicated computer, a computer network, or other programmable apparatuses. The computer instructions may be stored in a computer-readable storage medium or transmitted from one computer-readable storage medium to another computer-readable storage medium. For example, the computer instructions may be transmitted from a website, a computer, a server, or a data center to another website, computer, server or data center in a wired (such as coaxial cable, optical fiber, digital subscriber line (DSL)) or wireless (such as infrared, wireless, microwave, etc.) manner. The computer-readable storage medium may be any available medium that can be accessed by a computer or a data storage device such as a server or data center integrated with one or more available medium. The available medium may be a magnetic medium (for example, a floppy disk, a hard disk, and a magnetic tape), an optical medium (for example, a DVD), or a semiconductor medium (for example, a solid state disk (SSD)), etc.

It should be noted that the relationship terms use herein, such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "include(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the apparatus, electronic device, computer-readable storage medium and computer program are described briefly, since they are substantially similar to the embodiment of the method, and the related contents can refer to the description of the embodiment of the method.

The embodiments mentioned-above are some embodiments of the present disclosure, and are not intended to limit the scope of protection of the present disclosure. Any modification, equivalent, or improvement within the spirit and principle of the present disclosure are contained within the scope of protection of the present disclosure.

The invention claimed is:

1. A method of storing slides, comprising:
when a save-all-as operation for custom show information input by a user is detected, taking all pieces of custom show information generated in a first presentation file as target custom show information and determining reception of a save-as instruction for the target custom show information generated in the first presentation file, wherein, the target custom show information comprises slides selected from the first presentation file and a show sequence of the selected slides;
for each of the pieces of the target custom show information, acquiring property information of a second presentation file corresponding to the piece of target custom show information; and
for each of the pieces of the target custom show information, extracting, based on the property information of the second presentation file corresponding to the piece of target custom show information and based on the show sequence comprised in the piece of target custom show information, the slide data corresponding to the slides comprised in the piece of target custom show information from the first presentation file, and storing the extracted slide data in the second presentation file corresponding to the piece of target custom show information.

2. The method of claim 1, wherein, for each of the pieces of target custom show information, extracting, based on the property information of the second presentation file corresponding to the piece of target custom show information and based on the show sequence comprised in the piece of target custom show information, the slide data corresponding to the slides comprised in the piece of target custom show information from the first presentation file, and storing the extracted slide data in the second presentation file corresponding to the piece of target custom show information comprises:
- sequentially selecting, based on a preset storing sequence, a piece of target custom show information from all the pieces of target custom show information;
- extracting the slide data corresponding to the slides comprised in the selected piece of target custom show information from the first presentation file, based on the property information of the second presentation file corresponding to the selected piece of target custom show information and based on the show sequence comprised in the selected piece of target custom show information; and
- storing the extracted slide data in the second presentation file corresponding to the selected piece of target custom show information;
- wherein, the preset storing sequence is one of: a sequence of a generation time of each of the pieces of custom show information from early to later, a sequence of a number of slides comprised in each of the pieces of custom show information from more to less, a sequence of a number of times that the slides comprised in each of the pieces of custom show information are shown from more to less, a sequence of a consumption duration for generating each of the pieces of custom show information from long to short, a sequence of a modification time of each of the pieces of custom show information from early to later, and a sequence of a number of times that each of the pieces of custom show information is modified from more to less.

3. The method of claim 1, the method further comprising:
for each of the pieces of target custom show information, if a cancel instruction is received during performing an operation for storing the slides of the piece of target custom show information, then:
- cancelling the performance of the operation for storing the slides of the piece of target custom show information, or
- cancelling the performance of the operation for storing the slides of the piece of target custom show information, and cancelling a non-performed operation for storing slides, or
- cancelling the performance of the operation for storing the slides of the piece of target custom show information, cancelling a non-performed operation for storing the slides, and deleting the second presentation file obtained from a performed operation for storing the slides;
- wherein, the operation for storing the slides comprises: based on the show sequence comprised in each of the pieces of target custom show information, extracting the slide data corresponding to the slides comprised in the piece of target custom show information from the first presentation file and storing the extracted slide data in the second presentation file corresponding to the piece of target custom show information.

4. The method of claim 1, wherein, the property information comprises a storage location, a file name and a file format.

5. An electronic device, comprising a processor, a communication interface, a memory and a communication bus; wherein, the processor, the communication interface and the memory communicate with each other via the communication bus;
- the memory is configured for storing a computer program; and
- the processor is to perform, when executing the computer program stored in the memory, operations of:
  - when a save-all-as operation for custom show information input by a user is detected, taking all pieces of custom show information generated in a first presentation file as target custom show information and determining reception of a save-as instruction for the target custom show information generated in the first presentation file, wherein, the target custom show information comprises slides selected from the first presentation file and a show sequence of the selected slides;
  - for each of the pieces of the target custom show information, acquiring property information of a second presentation file corresponding to the piece of target custom show information; and
  - for each of the pieces of the target custom show information, extracting, based on the property information of the second presentation file corresponding to the piece of target custom show information and based on the show sequence comprised in the piece of target custom show information, the slide data corresponding to the slides comprised in the piece of target custom show information from the first presentation file, and storing the extracted slide data in the second presentation file corresponding to the piece of target custom show information.

6. A non-transitory computer-readable storage medium, storing a computer program; wherein, when the computer program is executed by a processor, the processor performs operations of:
- when a save-all-as operation for custom show information input by a user is detected, taking all pieces of custom show information generated in a first presentation file as target custom show information and determining reception of a save-as instruction for the target custom show information generated in the first presentation file, wherein, the target custom show information comprises slides selected from the first presentation file and a show sequence of the selected slides;
- for each of the pieces of the target custom show information, acquiring property information of a second presentation file corresponding to the piece of target custom show information; and
- for each of the pieces of the target custom show information, extracting, based on the property information of the second presentation file corresponding to the piece of target custom show information and based on the show sequence comprised in the piece of target custom show information, the slide data corresponding to the slides comprised in the piece of target custom show information from the first presentation file, and storing the extracted slide data in the second presentation file corresponding to the piece of target custom show information.

7. The electronic device according to claim 5, wherein, for each of the pieces of target custom show information, extracting, based on the property information of the second presentation file corresponding to the piece of target custom show information and based on the show sequence comprised in the piece of target custom show information, the slide data corresponding to the slides comprised in the piece of target custom show information from the first presentation file, and storing the extracted slide data in the second presentation file corresponding to the piece of target custom show information comprises:

sequentially selecting, based on a preset storing sequence, a piece of target custom show information from all the pieces of target custom show information;

extracting the slide data corresponding to the slides comprised in the selected piece of target custom show information from the first presentation file, based on the property information of the second presentation file corresponding to the selected piece of target custom show information and based on the show sequence comprised in the selected piece of target custom show information; and     storing the extracted slide data in the second presentation file corresponding to the selected piece of target custom show information;

wherein, the preset storing sequence is one of: a sequence of a generation time of each of the pieces of custom show information from early to late, a sequence of a number of slides comprised in each of the pieces of custom show information from more to less, a sequence of a number of times that the slides comprised in each of the pieces of custom show information are shown from more to less, a sequence of a consumption duration for generating each of the pieces of custom show information from long to short, a sequence of a modification time of each of the pieces of custom show information from early to late, and a sequence of a number of times that each of the pieces of custom show information is modified from more to less.

8. The electronic device according to claim 5, wherein, the operations further comprising:

for each of the pieces of target custom show information, if a cancel instruction is received during performing an operation for storing the slides of the piece of target custom show information, then:

cancelling the performance of the operation for storing the slides of the piece of target custom show information, or         cancelling the performance of the operation for storing the slides of the piece of target custom show information, and cancelling a non-performed operation for storing slides, or         cancelling the performance of the operation for storing the slides of the piece of target custom show information, cancelling a non-performed operation for storing the slides, and deleting the second presentation file obtained from a performed operation for storing the slides;

wherein, the operation for storing the slides comprises: based on the show sequence comprised in each of the pieces of target custom show information, extracting the slide data corresponding to the slides comprised in the piece of target custom show information from the first presentation file and storing the extracted slide data in the second presentation file corresponding to the piece of target custom show information.

9. The electronic device according to claim 5, wherein, the property information comprises a storage location, a file name and a file format.

10. The method of claim 1, further comprising:

acquiring the property information of the second presentation file based on the save-as instruction;

displaying a save-as dialog box based on the save-as instruction; and     receiving the property information of the second presentation file input by the user into the save-as dialog box.

11. The electronic device according to claim 5, wherein, the operations further comprise:

acquiring the property information of the second presentation file based on the save-as instruction;

displaying a save-as dialog box based on the save-as instruction; and     receiving the property information of the second presentation file input by the user into the save-as dialog box.

* * * * *